United States Patent
Akahane et al.

(10) Patent No.: US 7,174,780 B2
(45) Date of Patent: Feb. 13, 2007

(54) SYSTEM FOR MEASURING QUANTITY OF LIQUID FUEL AND METHOD FOR MEASURING QUANTITY OF LIQUID FUEL

(75) Inventors: Eiji Akahane, Tokyo (JP); Makoto Sakai, Tokyo (JP); Kenji Takami, Hyogo (JP)

(73) Assignee: Shin Caterpillar Mitsubishi Ltd., Tokyo (JP)

( * ) Notice: Subject to any disclaimer, the term of this patent is extended or adjusted under 35 U.S.C. 154(b) by 0 days.

(21) Appl. No.: 10/517,836

(22) PCT Filed: Dec. 5, 2003

(86) PCT No.: PCT/JP03/15600

§ 371 (c)(1),
(2), (4) Date: Dec. 15, 2004

(87) PCT Pub. No.: WO2004/076844

PCT Pub. Date: Sep. 10, 2004

(65) Prior Publication Data

US 2005/0217368 A1 Oct. 6, 2005

(30) Foreign Application Priority Data

Feb. 27, 2003 (JP) .............................. 2003-051718

(51) Int. Cl.
*G01F 23/16* (2006.01)
(52) U.S. Cl. ..................... 73/149; 73/290 R; 73/290 B
(58) Field of Classification Search ..................... None
See application file for complete search history.

(56) References Cited

U.S. PATENT DOCUMENTS 5,556,002 A * 9/1996 Green ........................ 222/21
5,859,365 A * 1/1999 Kataoka et al. ............... 73/149

FOREIGN PATENT DOCUMENTS

| JP | 57-154526 | U | 9/1982 |
|---|---|---|---|
| JP | 1-112117 | A | 4/1989 |
| JP | 6-101460 | A | 4/1994 |
| JP | 6-18052 | Y2 | 5/1994 |
| JP | 2516601 | Y2 | 8/1996 |

* cited by examiner

*Primary Examiner*—Hezron Williams
*Assistant Examiner*—Paul M. West
(74) *Attorney, Agent, or Firm*—Birch, Stewart, Kolasch & Birch, LLP

(57) ABSTRACT

When air pressure within a first container is less than a predetermined pressure, air is supplied into the first container through a first pipeline by a pressure application unit. Both the volume of the supplied air and a quantity of change in the air pressure within the first container due to the air supply are detected or calculated, and the volume of the liquid fuel within the first container is calculated from both the volume of the supplied air and the quantity of change in the air pressure. When the liquid fuel within a second container is less than a predetermined quantity, a predetermined quantity of liquid fuel is fed from the first container into the second container through a second pipeline by a feed unit, and the volume of the liquid fuel within the first container is calculated based on the number of times that the liquid fuel was fed.

10 Claims, 6 Drawing Sheets

SYSTEM FOR MEASURING QUANTITY OF LIQUID FUEL AND METHOD FOR MEASURING QUANTITY OF LIQUID FUEL

BACKGROUND OF THE INVENTION

1. Field of the Invention

The present invention relates to a system for measuring a liquid fuel quantity within a container, and a liquid fuel quantity measurement method employing the measurement system.

2. Description of Related Art

A typical construction machine such as a hydraulic shovel is made up of a traveling substructure for making a movement, and a revolving superstructure for performing operations. In such a construction machine, the traveling substructure contains only traveling devices such as tires and crawlers, while the revolving superstructure contains many devices, such as a working arm, actuators, an engine, a counter weight, a fuel tank, and a controller for controlling various devices, compared with the traveling substructure. Because of this, considering the case where such a construction machine performs operations at urban districts or at narrow sites, there is a strong demand for a reduction in the size and operating radius of the revolving superstructure.

To meet such a demand, there is disclosed a technique of making the revolving superstructure compact, by arranging a fuel tank in the traveling substructure to leave a sufficient margin for the arrangement of various devices provided in the revolving superstructure (e.g., Japanese Utility Model Publication No. Hei 6-18052). In this technique, by arranging the fuel tank and fuel feed pump in the traveling substructure and delivering fuel to the engine provided in the revolving superstructure through a swivel joint, the fuel tank can be removed from the revolving superstructure, and at the same time, the radius of the revolving superstructure can be reduced.

However, in the above-described technique, there is a great difference in height (head) between the fuel tank in the traveling substructure and the engine in the revolving superstructure, and consequently, there is a possibility that the fuel in the fuel feed passageway connecting the fuel tank and the engine will go down to the fuel tank and the fuel supply will be shut off.

There is also disclosed a technique of preventing fuel from going down to a fuel tank, by disposing a fuel feed pump and a check valve in parallel in a fuel feed passageway extending between an engine with a fuel pump and the fuel tank (e.g., Japanese Utility Model No. 2516601). In this technique, when there is no failure in the fuel supply system, fuel is supplied to the engine through the check valve by the fuel pump attached to the engine, without operating the fuel feed pump. Since the check valve prevents fuel from going down, the fuel supply can be prevented from being shut off. On the other hand, when a failure occurs in the fuel supply system and the fuel supply is shut off, the fuel feed pump arranged in parallel with the check valve is operated to forcibly supply fuel to the engine.

None of the above-described patent documents give a description of devices that measure a fuel quantity within a fuel tank, but in the case of typical construction machines, the fuel tank is provided with a float gauge to detect the liquid surface. However, when the fuel tank is tilted, or when the liquid surface is moving, it is difficult to accurately grasp a fuel quantity.

Particularly, when the fuel tank is provided in the traveling substructure of a construction machine, it is often formed into a flat shape because of the physical restriction of the space in which the fuel tank is housed. In this case, the liquid surface tends to change greatly by the tilt of a construction machine, so it is even more difficult to make an accurate measurement.

When the fuel tank is arranged in the traveling substructure, as in the techniques disclosed in the above-described patent documents, a slip ring for connecting float-gauge signal lines (electric wires) at the swivel joint is required in order to transmit information detected by the float gauge to the revolving superstructure. In this case, the structure of the swivel joint between the revolving superstructure and the traveling substructure is complex.

The present invention has been made in view of the circumstances above mentioned. Accordingly, the present invention provides a system that is capable of accurately measuring liquid fuel stored in a container. The present invention also provides a liquid fuel quantity measurement method employing the measurement system.

SUMMARY OF THE INVENTION

One aspect of the present invention is to provide a first liquid fuel quantity measurement system. The first measurement system includes a first container for storing liquid fuel therein; pressure application means for raising air pressure within the first container by supplying air into the first container; and air-pressure measurement means for measuring the air pressure within the first container. The measurement system also includes a first pipeline through which the first container and the pressure application means communicate with each other; a second container connected with the first container; and a second pipeline through which the first container and the second container communicate with each other. The measurement system further includes feed means for feeding the liquid fuel within the first container into the second container through the second pipeline; detection means for detecting a reduction in the liquid fuel within the second container; and control means for controlling the feed means and the pressure application means by selecting either a pressure mode or a supply mode, based on information from both the air-pressure measurement means and the detection means. The measurement system further includes air-volume measurement means for measuring the volume of air supplied into the first container through the first pipeline by the pressure application means, and arithmetic means. During the pressure mode, the arithmetic means calculates the volume of the liquid fuel within the first container from both the volume of air measured by the air-volume measurement means and a quantity of change in air pressure calculated from the air pressure within the first container measured by the air-pressure measurement means. During the supply mode, the arithmetic means calculates the volume of the liquid fuel within the first container from the number of times that the liquid fuel was fed from the first container into the second container.

In accordance with the present invention, there is also provided a first liquid fuel quantity measurement method. The first measurement method includes a first container for storing liquid fuel therein; pressure application means for raising air pressure within the first container by supplying air into the first container; and a first pipeline through which the first container and the pressure application means communicate with each other. The measurement method further includes a second container connected with the first container; a second pipeline through which the first container and the second container communicate with each other; and feed means for feeding the liquid fuel within the first container into the second container through the second pipeline. When the air pressure within the first container is less than a predetermined pressure, air is supplied into the first container through the first pipeline by the pressure application means. Also, both the volume of the supplied air and a quantity of change in the air pressure within the first container due to the air supply are detected or calculated, and the volume of the liquid fuel within the first container is calculated from both the volume of the supplied air and the quantity of change in the air pressure. When the liquid fuel within the second container is less than a predetermined quantity, a predetermined quantity of liquid fuel is fed from the first container into the second container through the second pipeline by the feed means, and the volume of the liquid fuel within the first container is calculated based on the number of times that the liquid fuel was fed.

According to the first measurement system and method of the present invention, a liquid fuel quantity within the first container can be accurately grasped regardless of the shape and tilt of the container. Thus, a liquid fuel quantity supplied from the first container to the second container can be accurately measured.

In accordance with the present invention, there is provided a second liquid fuel quantity measurement system. The second measurement system includes a first container for interiorly storing liquid fuel; pressure application means for raising air pressure within the first container by supplying air into the first container; and air-pressure measurement means for measuring the air pressure within the first container. The second measurement system also includes a first pipeline through which the first container and the pressure application means communicate with each other; air-volume measurement means for measuring the volume of air supplied into the first container through the first pipeline by the pressure application means; and arithmetic means. The arithmetic means is used for calculating the volume of the liquid fuel within the first container from both the volume of air measured by the air-volume measurement means and a quantity of change in air pressure calculated from the air pressure within the first container measured by the air-pressure measurement means.

In accordance with the present invention, there is provided a second liquid fuel quantity measurement method. The second measurement method includes a first container for storing liquid fuel therein; pressure application means for raising air pressure within the first container by supplying air into the first container; and a first pipeline through which the first container and the pressure application means communicate with each other. Air is supplied into the first container through the first pipeline by the pressure application means. Also, both the volume of the supplied air and a quantity of change in the air pressure within the first container due to the air supply are detected or calculated, and the volume of the liquid fuel within the first container is calculated from both the volume of the supplied air and the quantity of change in the air pressure.

According to the second measurement system and method of the present invention, a liquid fuel quantity within the first container can be accurately grasped regardless of the shape and tilt of the container.

In accordance with the present invention, there is provided a third liquid fuel quantity measurement system. The third measurement system includes a first container for interiorly storing liquid fuel; a second container connected with the first container; a second pipeline through which the first container and the second container communicate with each other; and feed means for feeding the liquid fuel within the first container into the second container through the second pipeline. The third measurement system further includes detection means for detecting the remaining quantity of the liquid fuel within the second container; control means for controlling the feed means, based on information from the detection means; and arithmetic means for calculating the volume of the liquid fuel within the first container from the number of times that the liquid fuel was fed from the first container into the second container.

In accordance with the present invention, there is provided a third liquid fuel quantity measurement method. The third measurement method includes a first container for storing liquid fuel therein; a second container connected with the first container; a second pipeline through which the first container and the second container communicate with each other; and feed means for feeding the liquid fuel within the first container into the second container through the second pipeline. In third measurement method, a predetermined quantity of liquid fuel is fed from the first container into the second container through the second pipeline by the feed means, and the volume of the liquid fuel within the first container is calculated based on the number of times that the liquid fuel was fed.

According to the third measurement system and method of the present invention, a liquid fuel quantity from the first container to the second container can be accurately measured.

In the first or second liquid fuel quantity measurement system, the aforementioned air-volume measurement means is constructed of raised-pressure measurement means for measuring the raised pressure, and storage means for storing a corresponding relationship between the raised air pressure and the volume of air supplied into the first container.

With this construction, the volume of air within the first container can be easily measured.

The aforementioned air-volume measuring means is also used as the raised-pressure measurement means. This makes the construction simpler.

The first liquid fuel quantity measurement system of the present invention further includes a first pipeline valve for regulating flow within the first pipeline, and a second pipeline valve for regulating flow within the second pipeline. And a portion of the first pipeline extending from the first pipeline valve toward the first container and a portion of the second pipeline extending from the second pipeline valve toward the first container are merged into one.

Thus, by merging the first pipeline and second pipeline into one and providing the first pipeline valve and second pipeline valve, that portion of the second pipeline which extends from the connecting portion between the first and second pipelines toward the first container can be used as both a fuel feed passage and an air supply passage. Thus, the piping structure can be made simpler. In addition, except when air is supplied into the main tank (the first container) by the air pump (pressure application means), the pipelines are filled with fuel and the pressure within the pipeline has practically no reduction, so the occurrence of rust within the pipelines can be prevented.

The liquid fuel quantity measurement system of the prevent invention may be provided in a construction machine, which is equipped with a traveling substructure and a revolving superstructure revolvably mounted on the traveling substructure through a swivel joint. In this case, the first container is provided as a main fuel tank in the traveling substructure, and the second container is provided as an auxiliary fuel tank in the revolving superstructure.

Since the fuel tank is arranged in the traveling substructure, the size and operating radius of the revolving superstructure can be made smaller. In addition, the fuel tank is disposed in the traveling substructure, so the energy required for revolving the superstructure can be reduced. Furthermore, because the fuel tank is arranged in the traveling substructure, the center of gravity of the entire construction machine is lowered and the body of the machine becomes stable.

BRIEF DESCRIPTION OF THE DRAWINGS

The present invention will be described in further detail with reference to the accompanying drawings wherein.

DETAILED DESCRIPTION OF THE INVENTION

Referring to FIGS. 1 through 5, there is shown a construction machine with a liquid fuel quantity measurement system constructed in accordance with an embodiment of the present invention. The construction machine is made up of a traveling substructure 30, and a revolving superstructure 20 revolvably mounted on the traveling substructure 30 through a swivel joint 10. An engine 2 provided within the revolving superstructure 20 drives a hydraulic pump 19, which applies pressure to driving oil through which the entire construction machine is driven. Although not shown, the revolving superstructure 20 further includes a working arm, an actuator, a counter weight, an operator cab with a controller for controlling various devices, and so forth.

Figure 1:
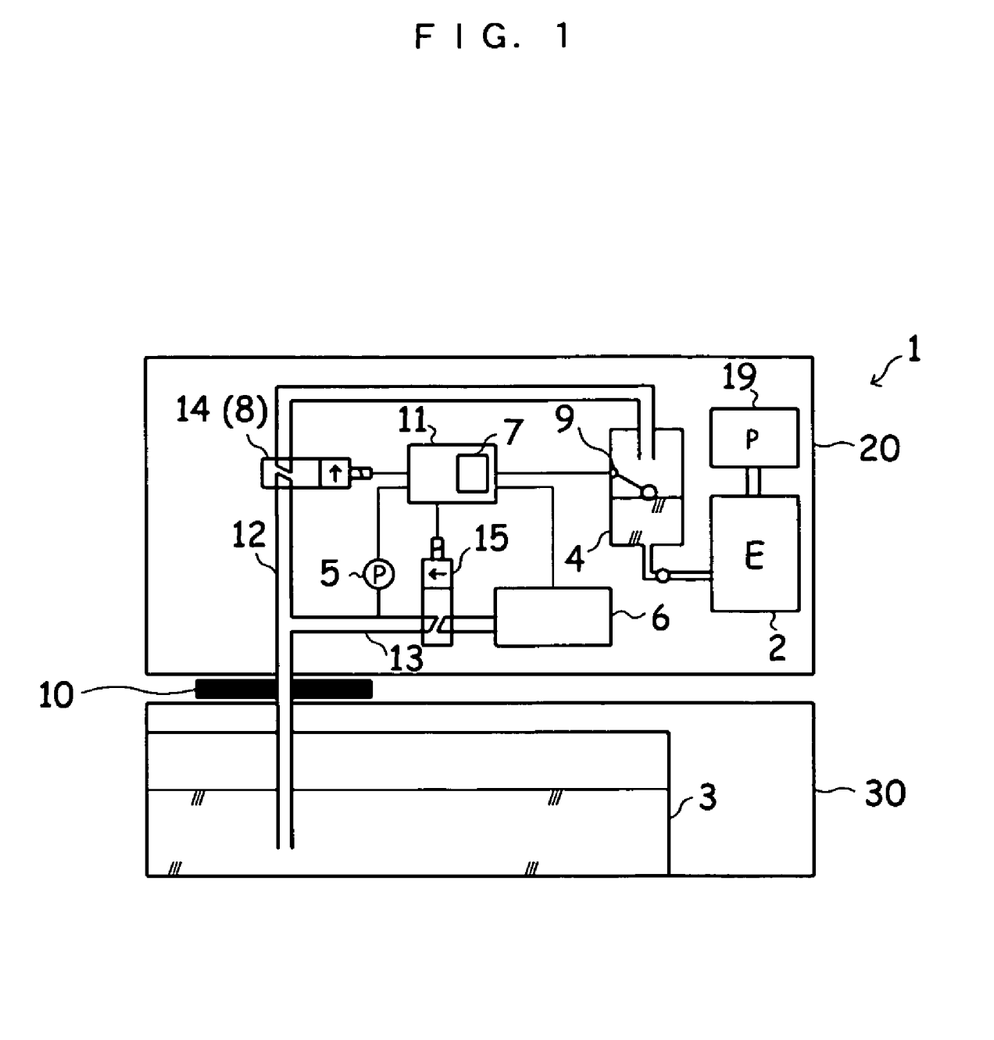
FIG. 1 is a schematic diagram showing a construction machine with a liquid fuel quantity measurement system constructed in accordance with a preferred embodiment of the present invention.

Also, the liquid fuel quantity measurement system according to the embodiment is attached to a fuel feed pump, which feeds fuel from a main tank (first container) 3 to the engine 2 through an auxiliary tank (second container) 4. The liquid fuel quantity measurement system is used to measure the fuel quantity within the main tank 3 and the fuel quantity within the auxiliary tank 4. The main tank 3 is constructed to store fuel that is supplied to the engine 2, and is provided in the traveling substructure 30. In addition, the main tank 3 is hermetically sealed to prevent leakage of fuel or air and entry of rain or water. On the other hand, the auxiliary tank 4 stores a definite quantity (a fixed quantity) of fuel to drive the engine 2 and is provided in the revolving superstructure 20 and communicates with the main tank 3 through a second pipeline 12. The fuel stored within the main tank 3 is fed into the auxiliary tank 4 through the second pipeline 12, in which a definite quantity (a fixed quantity) of fuel is temporarily stored. The fuel within the auxiliary tank 4 is reliably supplied to the engine 2.

Within the auxiliary tank 4, there is provided a float sensor (detection means) 9, which detects the quantity of fuel stored within the auxiliary tank 4 in dependence on the position of a float on the fuel surface and outputs a detection signal to a controller (control means) 11.

The revolving superstructure 20 is further provided with an air pump 6 for feeding air into the main tank 3. The air pump 6 is in communication with the main tank 3 through a first pipeline 13 branched from the second pipeline 12 at the upstream side of a second pipeline valve 14.

The second pipeline 12 is provided with the second with a second pipeline valve (supply shut-off valve) 14. If the second pipeline valve 14 is opened, fuel is supplied from the main tank 3 to the auxiliary tank 4. On the other hand, if the second pipeline valve 14 is closed, the fuel supply to the auxiliary tank 4 is stopped and the fuel flow from the main tank 3 is prevented. Similarly, the first pipeline 13 is provided with a first pipeline valve (supply shut-off valve) 15. If the first pipeline valve 15 is opened, air is supplied from the air pump (pressure application means) 6 to the main tank 3. On the other hand, if the first pipeline valve 15 is closed, the air supply to the main tank 3 is stopped and the air flow from the main tank 3 to the air pump 6 is prevented. The first pipeline valve 15 and second pipeline valve 14 are opened or closed by the controller 11, and they are normally closed. If the air pump 6 feeds air to the main tank 3 through the first and second pipelines 13 and 12, air is accumulated within the main tank 3 and therefore the pressure within the main tank 3 is increased.

The connecting portion between the first pipeline 13 and the second pipeline 12 is provided within the revolving superstructure 20, and the upstream side of the second pipeline 12 from that connecting portion is disposed within the swivel joint 10. Therefore, even in the structure where the air pump 6 is provided within the revolving superstructure 20, the number of pipelines disposed within the swivel joint 10 can be made one and the structure within the swivel joint 10 can be simplified.

The first pipeline 13 is further provided with a pressure sensor (air-pressure measurement means) 5, which detects the pressure within the main tank 3 indirectly by detecting the pressure within the first pipeline 13.

The controller 11 is used to control the operation of the air pump 6, first pipeline valve 15, and second pipeline valve 14. That is, the controller 11 controls the direction and quantity that air and fuel flow, by controlling the operation of the air pump 6 and opening or closing the first and second pipeline valves 15 and 14, in dependence on input signals from the float sensor 9 and pressure sensor 5. Thus, the controller 11 is able to control the quantity of fuel fed from the main tank 3 into the auxiliary tank 4. When the pressure within the main tank 3 detected by the pressure sensor 5 is less than a predetermined value, the air pump 6 is operated and the first pipeline valve 15 is opened, whereby the pressure within the main tank 3 is increased. On the other hand, when the pressure within the main tank 3 detected by the pressure sensor 5 is equal to or greater than the predetermined value, the air pump 6 is stopped and the first pipeline valve 15 is closed. The control means 11 also contains arithmetic means 7, which is used for calculating the quantity of fuel within the main tank 3.

If the fuel within the auxiliary tank 4 decreases and the liquid surface falls below a fixed level, the controller 11 opens the second pipeline valve 14 in dependence on a signal issued by the float sensor 9. At this time, the pressure within the main tank 3 is higher than the pressure within the auxiliary tank 4, so the fuel within the main tank 3 is fed into the auxiliary tank 4 through the second pipeline 12 and second pipeline valve 14. On the other hand, if the fuel within the auxiliary tank 4 increases and the liquid surface exceeds the fixed level, the controller 11 closes the second pipeline valve 14 in dependence on a signal issued by the float sensor 9.

Figure 2:
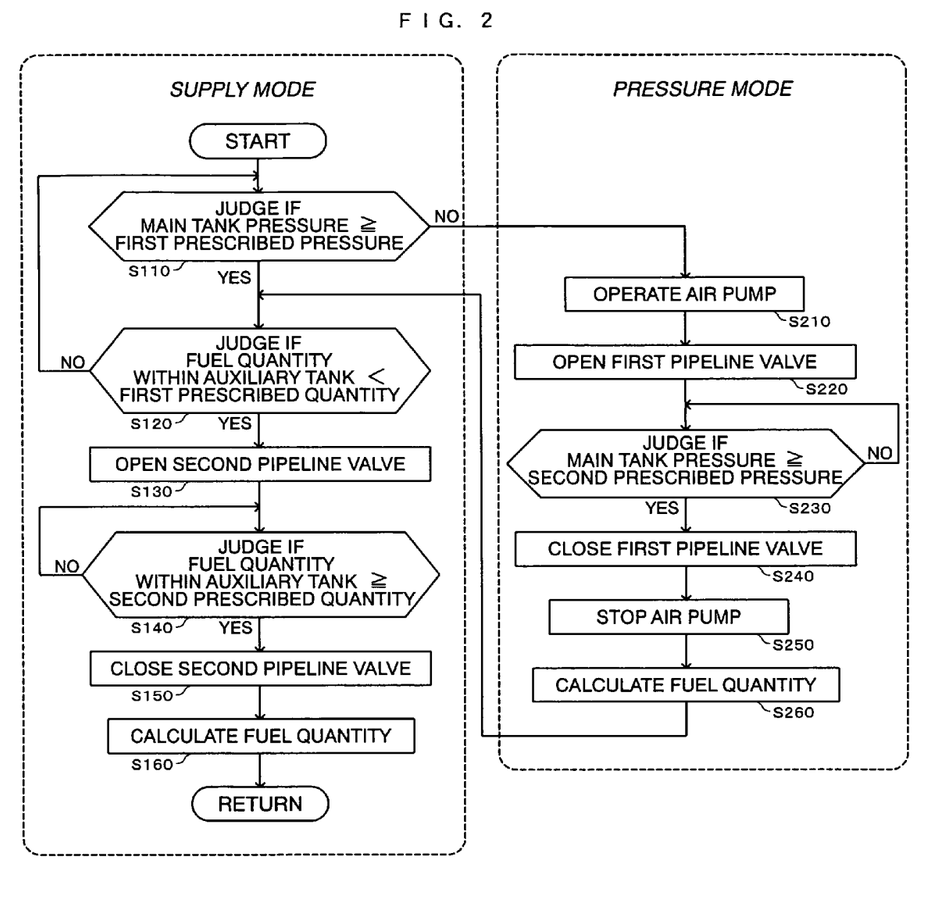
FIG. 2 is a control flow diagram showing how the supply of fuel and measurement of a fuel quantity are controlled by the liquid fuel quantity measurement system shown in FIG. 1.

FIG. 2 shows how fuel control is performed by the liquid fuel quantity measurement system of the embodiment. The steps shown in the figure is dependent on the main flow (not shown) that is carried out by the controller 11, so they are repeatedly carried out when necessary. Also, the following steps are performed by the controller 11.

In step S110, it is judged if the pressure $P_1$ (atm) within the main tank 3 detected by the pressure sensor 5 is equal to or greater than a first prescribed pressure $P_{min}$ (predetermined pressure). When $P_1$ is equal to or greater than the first prescribed pressure $P_{min}$, the controller 11 executes step 120 and those that follow (a supply mode) in which the fuel supply from the main tank 3 to the auxiliary tank 4 is controlled. When $P_1$ is less than the first prescribed pressure $P_{min}$, the controller 11 executes step 210 and those that follow (a pressure mode) in which the pressure within the main tank 3 is increased by the air pump 6. Note that the first prescribed pressure $P_{min}$ is set as a value such that the fuel within the main tank 3 is automatically supplied by the difference in pressure between the main tank 3 and the auxiliary tank 4.

Initially, the pressure mode is executed as follows:

In step S210, the air pump 6 is operated. In step S220, the first pipeline valve 15 is opened. If the first pipeline valve 15 is opened, air is supplied from the air pump 6 to the main tank 3 through the first pipeline 13. At this time, the pressure within the main tank 3 detected by the pressure sensor 5 is referred to as $P_2$ (atm).

In step S230, it is judged if the pressure $P_2$ is equal to or greater than a second prescribed pressure $P_{max}$ (predetermined pressure). When $P_2$ is equal to or greater than the second prescribed pressure $P_{max}$, in step S240 the first pipeline valve 13 is closed. When $P_2$ is less than the second prescribed pressure $P_{max}$, step S230 is repeated until $P_2$ reaches the second prescribed pressure $P_{max}$. Note that the second prescribed pressure $P_{max}$ in step S230 is set as a value greater than the first prescribed pressure $P_{min}$ in step S110 ($P_{max} > P_{min}$).

In step S250, the air pump 6 is stopped. At this time, the controller 11 calculates the volume (1 atm, that is, volume under the atmospheric pressure) of air $V_1$(l) supplied into the main tank 3 during the period from the operation start of the air pump 6 to the operation stop.

Figure 6:
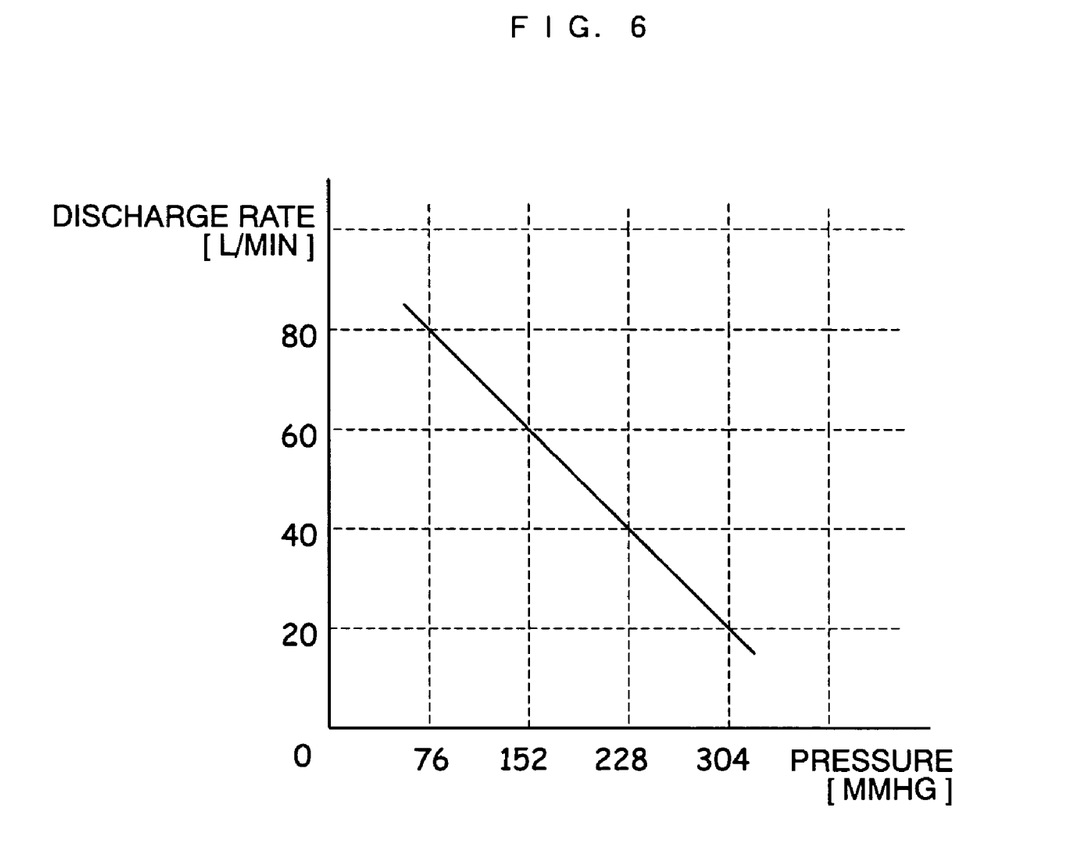
FIG. 6 is a map showing the discharge rate performance of the air pump (pressure application means) of the liquid fuel quantity measurement system shown in FIG. 1

The volume of air supplied into the main tank 3 equals the volume of air discharged from the air pump 6. Therefore, as indicated by a discharge rate performance graph for the air pump 6 shown in FIG. 6, there is a corresponding relationship between the discharge rate and discharge pressure of the air pump 6. Hence, if a map is previously made based on such a corresponding relationship (see FIG. 6), a discharge rate per unit time can be calculated in dependence on the pressure (which is the discharge pressure of the air pump 6 and corresponds to the pressure within the main tank 3) detected by the pressure sensor 5, using this map. If such a discharge rate is calculated at predetermined cycles (e.g., 0.3 sec), and the discharge rates during the period from the operation start of the air pump 6 to the operation stop are added up, the volume of air supplied into the main tank 3 can be calculated. That is, in the embodiment, the pressure sensor 5, and the corresponding map (storage means) between the discharge pressure (i.e., the raised pressure within the main tank 3) and discharge rate of the air pump 6, constitute air-volume measurement means that measures (or judges) the volume of air supplied into the first container by the pressure application means. The pressure sensor 5 is also used as raised-pressure measurement means that measures the discharge pressure of the air pump 6 (raised pressure within the main tank 3).

Note that air-pressure measurement means and raised-pressure measurement means may be separately provided. For example, in addition to the pressure sensor 5 as air-pressure measurement means, a pressure sensor as raised-pressure measurement means may be provided in the first pipeline 13.

In the embodiment, the air-volume measurement means is made up of the pressure sensor 5 for measuring the raised pressure, and the corresponding map in which the corresponding relationship between the raised pressure and the volume of air supplied into the main tank 3 is stored. However, a flow meter may be provided in the first pipeline 13 to directly measure the volume of air supplied into the main tank 3.

In addition, the cycles at which pressure is detected by the pressure sensor 5 may be made short (e.g., 0.1 sec) to more accurately measure the volume of air supplied.

In step S260, the fuel quantity within the main tank 3 is calculated. This calculation is performed by the arithmetic means 7. The liquid fuel quantity within the main tank 3 and the volume of the main tank 3 have practically no change and a temperature change in air is considered practically negligible. Therefore, if the volume of air within the main tank 3 is represented by $V_a$(l), the following equation is obtained from the equation of state.

$$P_1 \cdot V_a + 1 \cdot V_1 = P_2 \cdot V_a \qquad \text{(Eq. 1)}$$

Therefore, $V_a$ is obtained by the following equation:

$$V_a = V_1/(P_2 - P_1) \qquad \text{(Eq. 2)}$$

Since the volume $V_t$(l) of the main tank 3 is always constant, the fuel quantity (volume) $V_f$(l) within the main tank 3 is obtained by subtracting the volume $V_a$ of air from the volume $V_t$(l) of the main tank 3:

$$V_f = V_t - V_a \qquad \text{(Eq. 3)}$$

Thus, in the case of $P_1 < P_{min}$, the fuel quantity within the main tank 3 is measured from both the volume of air supplied into the main tank 3 by the air pump 6 and the pressure change quantity within the main tank 3.

If the calculation of the fuel quantity $V^f$ within the main tank 3 is finished, step 120 and those that follow (in which fuel is fed from the main tank 3 into the auxiliary tank 4) are carried out.

When fuel is fed from the main tank 3 into the auxiliary tank 4, or when calculation of $V_f$ is finished after the pressure within the main tank 3 is raised, step S120 is carried out. In step S120, it is judged if the fuel quantity $V_{fs}$ within the auxiliary tank 4 is less than a first prescribed quantity $V_{min}$. If it is less than the first prescribed quantity $V_{min}$, step S130 is carried out. On the other hand, if it is equal to or greater than the first prescribed quantity $V_{min}$, step S120 is repeated until the fuel within the auxiliary tank 4 is consumed and becomes less than the first prescribed quantity $V_{min}$. The first prescribed quantity $V_{min}$ is a value that represents a target lower limit value for the fuel liquid surface within the auxiliary tank 4 that can supply fuel without influencing operation of the engine 2. Step S120 is repeated until the fuel liquid surface becomes less than the target lower limit value. If the fuel liquid surface is less than this target lower limit value, step S130 is performed.

In step S130, the second pipeline valve 14 is opened. The pressure $P_2$ within the main tank 3 at this time is equal to or greater than the first prescribed pressure $P_{min}$, so if the second pipeline valve 14 is opened, fuel flows automatically from the main tank 3 to the auxiliary tank 4 and is fed into the auxiliary tank 4. And step S140 is executed.

In step S140, it is judged if the fuel quantity $V_{fs}$ within the auxiliary tank 4 is equal to or greater than a second prescribed quantity $V_{max}$. When it is equal to or greater than the second prescribed quantity $V_{max}$, step S150 is performed. When it is less than the second prescribed quantity $V_{max}$, step S140 is repeated until it reaches the second prescribed quantity $V_{max}$. The second prescribed quantity $V_{max}$ is a value that represents a target upper limit value for the fuel liquid surface within the auxiliary tank 4 that can feed fuel without influencing operation of the engine 2. Step S140 is repeated until the fuel liquid surface exceeds the target upper limit value. If the fuel liquid surface exceeds this target upper limit value, step S150 is performed. In step S150, the second pipeline valve 14 is closed. And step S160 is performed.

In step S160, after fuel has been fed from the main tank 3 into the auxiliary tank 4, the fuel quantity within the main tank 3 is calculated. This calculation is performed mainly by the arithmetic means 7. In the embodiment, the number N of times that a fixed quantity of fuel was supplied from the main tank 3 into the auxiliary tank 4 is counted. And if a fuel supply quantity per one time is multiplied by the number N, the total of fuel supply quantities from the main tank 3 into the auxiliary tank 4 can be calculated.

If a fuel supply quantity per one time is represented by $V_n$, $V_n$ is expressed by the following equation:

$$V_n = V_{max} - V_{min} \quad \text{(Eq. 4)}$$

Therefore, as indicated by the following equation, if $V_n$ multiplied by the fuel supply number N is subtracted from the fuel quantity $V_f$ within the main tank 3 calculated in step S260, the fuel quantity $V_f'$ within the main tank 3 in step S160 is calculated. And the fuel control is finished.

$$V_f' = V_f - N \cdot V_n \quad \text{(Eq. 5)}$$

With the above-described fuel control, the liquid fuel quantity measurement system according to the embodiment has the following advantages:

According to the above-described fuel control, when the pressure $P_1$ within the main tank 3 detected by the pressure sensor 5 is less than the first prescribed pressure $P_{min}$ (i.e., $P_1 < P_{min}$), the controller 11 starts the air pump 6 and causes the first pipeline valve 15 to open. Air under pressure is fed from the air pump 6 into the main tank 3 through the first pipeline valve 15. As a result, if the pressure $P_2$ within the main tank 3 is equal to or greater than the second prescribed pressure $P_{max}$, the controller 11 stops the operation of the air pump 6 and closes the first pipeline valve 15. Since the liquid fuel quantity within the main tank 3 and the volume of the main tank 3 have practically no change, the volume $V_a$ of air within the main tank 3 is expressed by Eq. 2, and the fuel quantity $V_f$ within the main tank 3 at that time is expressed by Eq. 3.

Thus, in the case of $P_1 < P_{min}$, air is supplied into the main tank 3 by the air pump 6, and from the volume of the supplied air and the pressure change quantity within the main tank 3, the fuel quantity within the main tank 3 can be accurately measured.

On the other hand, when $P_1$ is equal to or greater than $P_{min}$ ($P_1 \geq P_{min}$), it is judged if there is a sufficient quantity of fuel within the auxiliary tank 4. When the surface of fuel within the auxiliary tank 4 detected by the float sensor 9 is low and there is no sufficient quantity of fuel, the controller 11 opens the second pipeline valve 14 to supply fuel from the main tank 3 to the auxiliary tank 4. In this case, the air pressure within the main tank 3 is equal to or greater than $P_{min}$ ($P_1 \geq P_{min}$), so if the second pipeline valve 14 is opened, fuel is automatically supplied to the auxiliary tank 4 by the pressure difference between the main tank 3 and the auxiliary tank 4. And if the fuel surface detected by float sensor 9 becomes high and it is judged that a sufficient quantity of fuel has been fed, the controller 11 closes the second pipeline valve 14 to stop the feed of fuel from the main tank 3 to the auxiliary tank 4. Since a threshold value for judging the height of the liquid surface within the auxiliary tank 4 detected by float sensor 9 is always constant, a single fuel supply quantity from the main tank 3 to the auxiliary tank 4 is always constant and given by Eq. 4. The controller 11 also counts the number N of times that a fixed quantity of fuel was fed from the main tank 3 into the auxiliary tank 4, and multiplies a single fuel supply quantity $V_n$ by the number N to calculate the total quantity of fuel supplied from the main tank 3 into the auxiliary tank 4. And if the quantity of fuel supplied is subtracted from the fuel quantity $V_f$ within the main tank 3 according to Eq. 5, the fuel quantity $V_f'$ within the main tank 3 after fuel supply can be accurately calculated.

Thus, according to the present liquid fuel quantity measurement system, when the pressure within the main tank 3 is less than a prescribed value, the pressure within the main tank 3 is raised and the volume of air under pressure is calculated, whereby the quantity of fuel within the main tank 3 can be calculated. In addition, when the pressure within the main tank 3 is equal to or greater than the prescribed value, the fuel quantity within the main tank 3 can be calculated by calculating the quantity of fuel supplied from the main tank 3 to the auxiliary tank 4. The quantity of fuel calculated can be made accurate independently of the shape and tilt of the main tank 3.

The main tank 3 and auxiliary tank 4 communicate with each other through the second pipeline 2. Therefore, regardless of the distance between the main tank 3 and the auxiliary tank 4, the quantity of fuel within each tank can be accurately grasped and fuel can be reliably fed into the auxiliary tank 4. In addition, the main tank 3 and air pump 6 communicate with each other through the first pipeline 13. Therefore, regardless of the distance between the main tank 3 and the air pump 6, the pressure within the main tank 3 can be suitably increased.

If the first pipeline 13 and the second pipeline 12 are connected together and the opening and closing of each of the first pipeline valve 15 and second pipeline valve 14 is controlled, a portion of the second pipeline extending from the connecting portion between the first pipeline 13 and the second pipeline 12 to the main tank 3 can be used as both the fuel supply pipeline and the air supply pipeline. Thus, the piping structure can be made simpler. In addition, except when air is supplied into the main tank 3 by the air pump 6, the pipelines are filled with fuel and the pressure within the pipeline has practically no reduction, so the occurrence of rust within the pipelines can be prevented.

Figure 5:
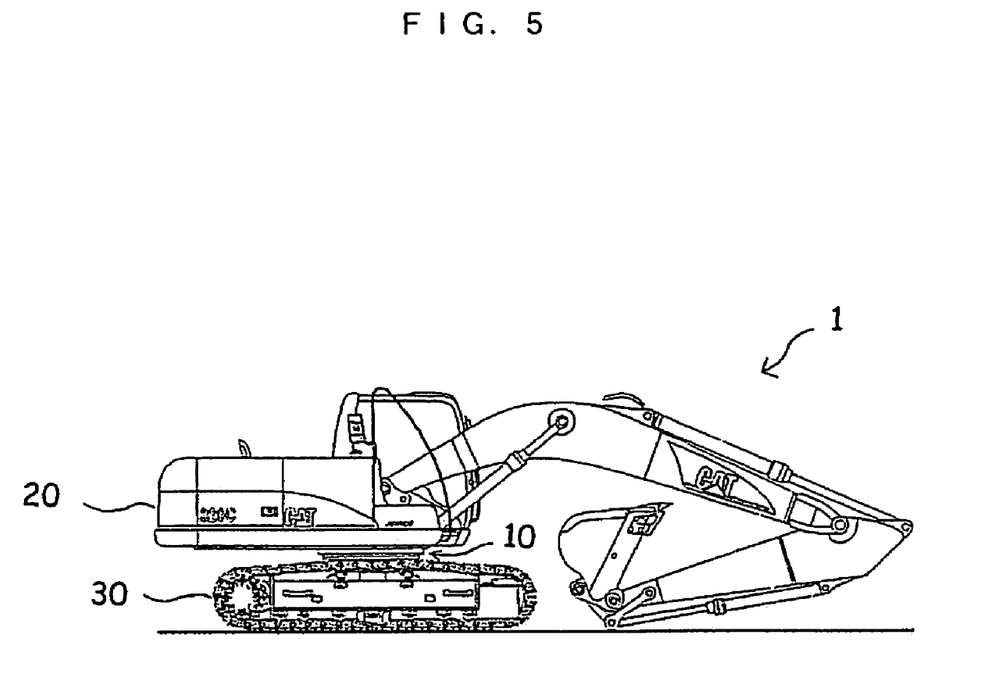
FIG. 5 is a side showing the construction machine equipped with the liquid fuel quantity measurement system shown in FIG. 1.

Because the main tank 3 is disposed within the traveling substructure 30, the size and operating radius of the revolving superstructure 20 can be reduced. In addition, the energy required for revolving the superstructure 20 can be made small compared with a construction where the main tank 3 is provided within the revolving superstructure 20. Furthermore, the arrangement where the fuel tank is provided within the traveling substructure 30 can lower the center of gravity of the entire construction machine and make the body of the machine stable. At this time, signal lines are connected in the swivel joint 10, so there is no need to provide a slip ring between the revolving superstructure 20 and the traveling substructure 30. Thus, the structure of the swivel joint 10 between the revolving superstructure 20 and the traveling substructure 30 can be made simpler.

While the present invention has been described with reference to the embodiment thereof, the invention is not to be limited to the details given herein, but may be modified within the scope of the invention hereinafter claimed.

In the embodiment, the controller 11 operates between the supply mode and the pressure mode. That is, the controller 11 selects one of the two modes to control the first pipeline valve 15, second pipeline valve 14, and air pump 6. However, the controller 11 may be operated only in either mode.

Figure 3:
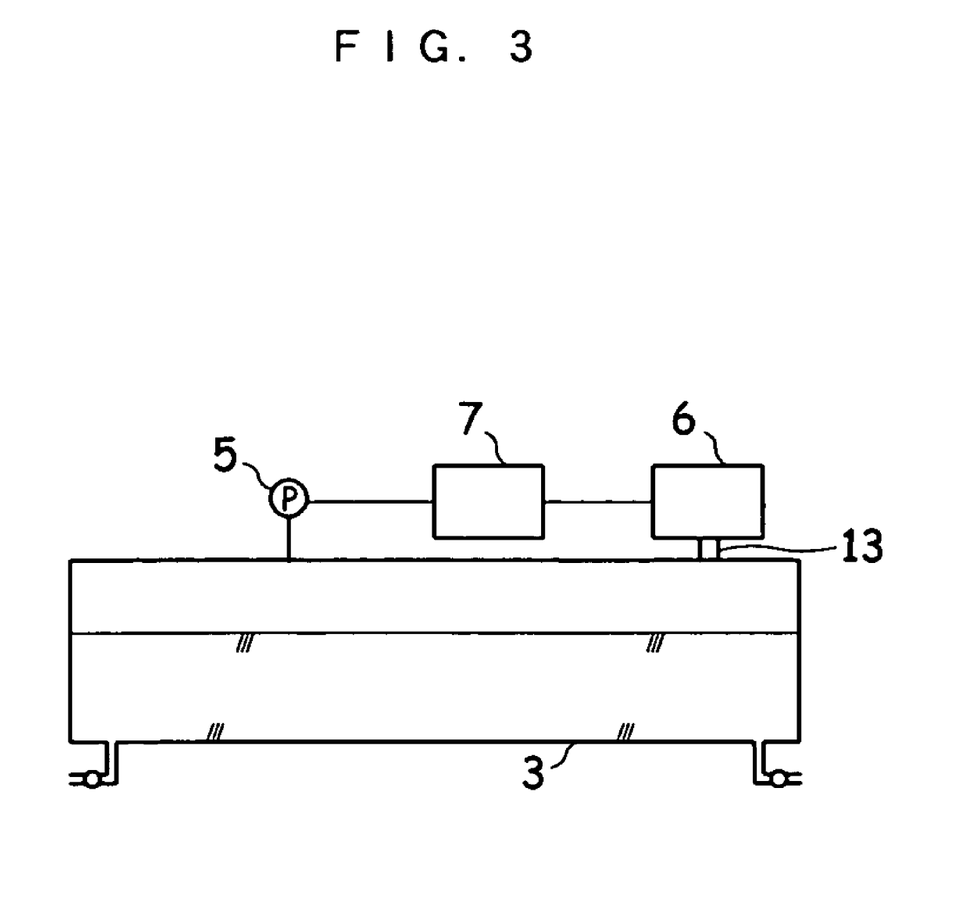
FIG. 3 is a schematic diagram showing a modification of the liquid fuel quantity measurement system shown in FIG. 1.

For instance, a liquid fuel quantity measurement system shown in FIG. 3 has only the pressure mode described in the embodiment shown in FIG. 1. Note that the same parts as the embodiment are represented by the same reference numerals.

The liquid fuel quantity measurement system shown in FIG. 3 is made up of a main tank (first container) 3 for storing liquid fuel; an air pump (pressure application means) 6 for supplying air into the main tank 3 to raise the air pressure within the main tank 3; a pressure sensor (air-pressure measurement means) 5 for measuring the air pressure within the main tank 3; a first pipeline 13 through which the main tank 3 and the air pump 6 communicate with each other; and arithmetic means 7 for calculating the volume of the liquid fuel within the main tank 3.

The pressure sensor 5 is mounted on the wall of the main tank 3 so it can directly detect the pressure of air within the main tank 3. As with the above-described embodiment, the pressure sensor 5 may be provided in the first pipeline 13 so that it can detect the pressure of air within the main tank 3 indirectly from the pressure within the first pipeline 13.

The pressure sensor 5 is also used as air-volume measurement means for measuring the volume of air supplied into the main tank 3 through the first pipeline 13 by the air pump 6. The arithmetic means 7 is constructed to calculate the volume of the liquid fuel within the main tank 3 from both the volume of air measured by the pressure sensor (air-volume measurement means) 5, and a quantity of change in the air pressure calculated from the air pressure within the main tank 3.

The volume of air supplied into the main tank 3 by the air pump 6 is equal to the air rate discharged from the air pump 6. Also, the discharge rate of air by the air pump 6 has a corresponding relationship with the discharge pressure of the air pump 6, so the volume of air supplied into the main tank 3 by the air pump 6 can be calculated by employing a map such as that shown in FIG. 6. And the fuel quantity within the main tank 3 can be measured based on the above-described Equations 1 to 3.

Figure 4:
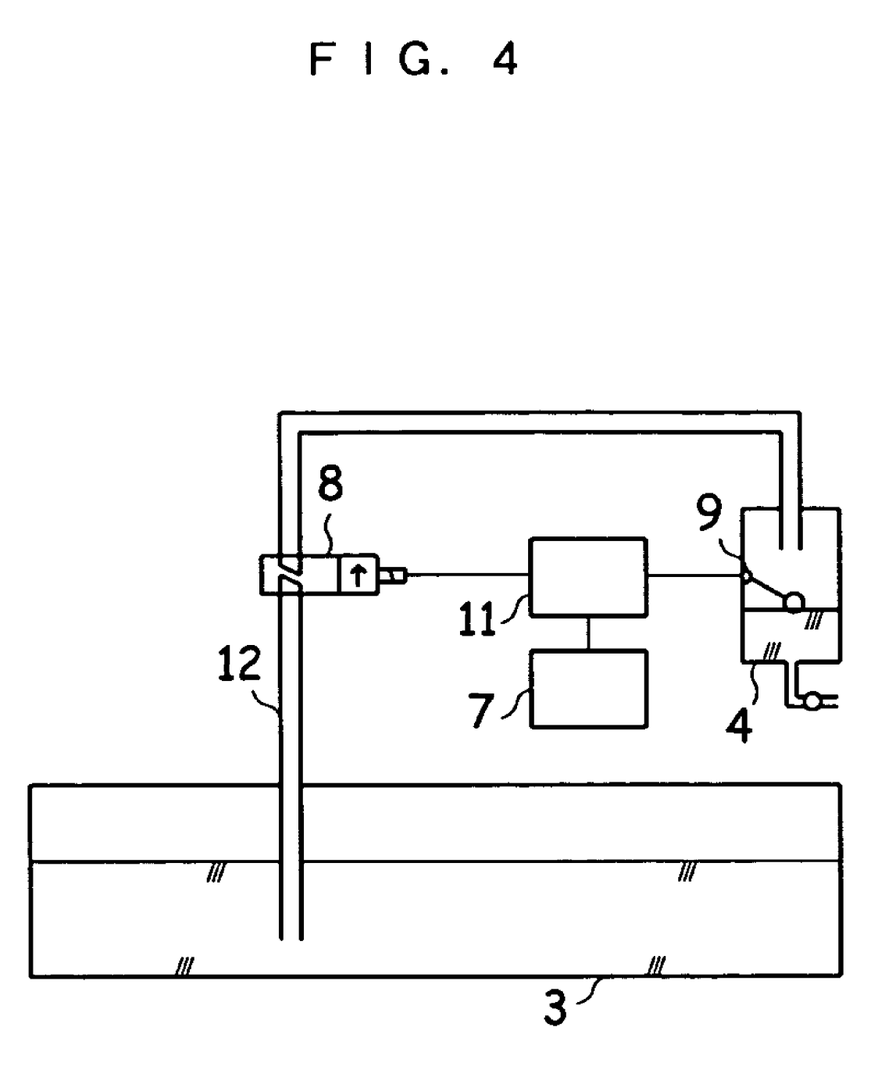
FIG. 4 is a schematic diagram showing another modification of the liquid fuel quantity measurement system shown in FIG. 1.

A liquid fuel quantity measurement system shown in FIG. 4 has only the supply mode described in the embodiment shown in FIG. 1. Note that the same parts as the embodiment are represented by the same reference numerals.

The liquid fuel quantity measurement system shown in FIG. 4 is made up of a main tank (first container) 3 for storing liquid fuel; an auxiliary tank (second container) 4 connected to the main tank 3; a second pipeline 12 through which the main tank 3 and the auxiliary tank 4 are connected; a second pipeline valve (feed means) 8 for feeding the liquid fuel within the main tank 3 into the auxiliary tank 4 through the second pipeline 12; a float sensor (detection means) 9 for detecting the remaining quantity of the liquid fuel within the auxiliary tank 4; a controller (control means) 11 for controlling the second pipeline valve 8 in dependence on the information from the float sensor 9; and arithmetic means 7 for calculating the volume of the liquid fuel within the main tank 3.

The arithmetic means 7 is constructed to calculate the volume of the liquid fuel within the main tank 3 from the number of times that a fixed quantity of liquid fuel was fed from the main tank 3 into the auxiliary tank 4.

The float sensor 9 is provided within the auxiliary tank 4 so it can detect the quantity of fuel stored within the auxiliary tank 4 in dependence on the position of the float of the sensor tip end.

The controller 11 controls the opening and closing of the second pipeline valve 8. If the fuel within the auxiliary tank 4 decreases and the liquid surface is lower than a fixed level, the controller 11 opens the second pipeline valve 8 according to a signal issued by the float sensor 9. As a result, the fuel within the main tank 3 passes along the second pipeline 12 and is fed into the auxiliary tank 4 through the second pipeline valve 8. And if the fuel within the auxiliary tank 4 increases and the liquid surface exceeds the fixed level, the controller 11 closes the second pipeline valve 8 according to a signal issued by the float sensor 9. Note that the internal pressure within the main tank 3 is set higher than the internal pressure within the auxiliary tank 4.

The liquid surface level to issue a signal for controller 11 within the auxiliary tank 4 detected by the float sensor 9 is always constant, so the arithmetic unit 7 is able to calculate the total of fuel supply quantities fed from the main tank 3 into the auxiliary tank 4 by multiplying a single fuel supply quantity by the number N of times that a fixed quantity of fuel was fed from the main tank 3 into the auxiliary tank 4.

Note that the liquid fuel quantity measurement systems constructed as described above are also applicable to the construction machine shown in FIGS. 1 and 5. In this case, it is preferable that the main tank 3 be provided within the traveling substructure 30 and also preferable that the auxiliary tank 4 be provided within the revolving superstructure 20.

Thus, the liquid fuel quantity measurement system shown in FIG. 3 is capable of performing control corresponding to the pressure mode, while the liquid fuel quantity measurement system shown in FIG. 4 is capable of performing control corresponding to the supply mode.

Also, the liquid fuel quantity measurement system and method of the present invention are not to be limited to only construction machines, but may be applied to all sorts of liquid fuel quantity measurement systems that measure a liquid fuel quantity accurately.

INDUSTRIAL APPLICABILITY

The liquid fuel quantity measurement system and method according to the present invention are not only useful in the field of conventional construction machines but also widely applicable to machines for measuring a liquid fuel quantity, so their industrial utilization is considered extremely high.

What is claimed is:

1. A liquid fuel quantity measurement system, comprising:
   a first container for storing liquid fuel therein;
   pressure application means for raising air pressure within said first container by supplying air into said first container;
   air-pressure measurement means for measuring the air pressure within said first container;
   a first pipeline through which said first container and said pressure application means communicate with each other;
   a second container connected with said first container;
   a second pipeline through which said first container and said second container communicate with each other;
   feed means for feeding the liquid fuel within said first container into said second container through said second pipeline;
   detection means for detecting a reduction in the liquid fuel within said second container;
   control means for controlling said feed means and said pressure application means by selecting either a pressure mode or a supply mode, based on information from both said air-pressure measurement means and said detection means;
   air-volume measurement means for measuring the volume of air supplied into said first container through said first pipeline by said pressure application means; and
   arithmetic means for calculating, during said pressure mode, the volume of the liquid fuel within said first container from both the volume of air measured by said air-volume measurement means and a quantity of change in air pressure calculated from the air pressure within said first container measured by said air-pressure measurement means, and for calculating, during said supply mode, the volume of the liquid fuel within said first container from the number of times that the liquid fuel was fed from said first container into said second container.

2. The liquid fuel quantity measurement system as set forth in claim 1, further comprising:
   a first pipeline valve for regulating flow within said first pipeline; and
   a second pipeline valve for regulating flow within said second pipeline;
   wherein a portion of said first pipeline extending from said first pipeline valve toward said first container and a portion of said second pipeline extending from said second pipeline valve toward said first container are merged into one.

3. The liquid fuel quantity measurement system as set forth in claim 2, provided in a construction machine equipped with a traveling substructure and a revolving superstructure revolvably mounted on said traveling substructure through a swivel joint,
   wherein said first container is provided as a main fuel tank in said traveling substructure, and said second container is provided as an auxiliary fuel tank in said revolving superstructure.

4. A liquid fuel quantity measurement system, comprising:
   a first container defining a space therein for storing liquid fuel, the liquid fuel making direct contact with air within said first container;
   pressure application means for raising air pressure of the air within said first container by supplying air into said first container;
   air-pressure measurement means for measuring the air pressure within said first container;
   a first pipeline through which said first container and said pressure application means communicate with each other;
   air-volume measurement means for measuring the volume of air supplied into said first container through said first pipeline by said pressure application means; and
   arithmetic means for calculating the volume of the liquid fuel within said first container from both the volume of air measured by said air-volume measurement means and a quantity of change in air pressure calculated from the air pressure within said first container measured by said air-pressure measurement means.

5. The liquid fuel quantity measurement system as set forth in claim 1 or 4, wherein said air-volume measurement means comprises raised-pressure measurement means for measuring the raised pressure, and storage means for storing a corresponding relationship between the raised air pressure and the volume of air supplied into said first container.

6. The liquid fuel quantity measurement system as set forth in claim 5, wherein said air-volume measuring means is also used as said raised-pressure measurement means.

7. A liquid fuel quantity measurement system, comprising:
   a first container for storing liquid fuel therein;
   a second container connected with said first container, a pressure inside the first container being maintained higher than a pressure inside the second container;
   a second pipeline through which said first container and said second container communicate with each other;
   feed means for selectively allowing and prohibiting the liquid fuel within said first container to be fed into said second container through said second pipeline;
   detection means for detecting the remaining quantity of the liquid fuel within said second container;
   control means for controlling said feed means, based on information from said detection means; and
   arithmetic means for calculating the volume of the liquid fuel within said first container from the number of times that the liquid fuel was allowed to be fed by said feed means from said first container into said second container.

8. A liquid fuel quantity measurement method, comprising:
   providing a first container for storing liquid fuel therein;
   providing pressure application means for raising air pressure within said first container by supplying air into said first container;
   providing a first pipeline through which said first container and said pressure application means communicate with each other;
   providing a second container connected with said first container;
   providing a second pipeline through which said first container and said second container communicate with each other; and
   providing feed means for feeding the liquid fuel within said first container into said second container through said second pipeline,
   supplying air into said first container through said first pipeline by said pressure application means when the air pressure within said first container is less than a predetermined pressure;
   detecting or calculating both the volume of the supplied air and a quantity of change in the air pressure within said first container due to the air supply;

calculating the volume of the liquid fuel within said first container from both the volume of the supplied air and the quantity of change in the air pressure;

feeding a predetermined quantity of liquid fuel from said first container into said second container through said second pipeline by said feed means when the liquid fuel within said second container is less than a predetermined quantity; and calculating the volume of the liquid fuel within said first container based on the number of times that the liquid fuel was fed.

9. A liquid fuel quantity measurement method, comprising:

providing a first container defining a space therein for storing liquid fuel, the liquid fuel making direct contact with air within said first container;

providing pressure application means for raising air pressure of the air within said first container by supplying air into said first container;

providing a first pipeline through which said first container and said pressure application means communicate with each other, supplying air into said first container through said first pipeline by said pressure application means;

detecting or calculating both the volume of the supplied air and a quantity of change in the air pressure within said first container due to the air supply; and calculating the volume of the liquid fuel within said first container from both the volume of the supplied air and the quantity of change in the air pressure.

10. A liquid fuel quantity measurement method, comprising:

providing a first container for storing liquid fuel therein;

providing a second container connected with said first container;

providing a second pipeline through which said first container and said second container communicate with each other;

maintaining a pressure inside the first container higher than a pressure insider the second container;

providing feed means for selectively allowing and prohibiting the liquid fuel within said first container to be fed into said second container through said second pipeline;

feeding a predetermined quantity of liquid fuel from said first container into said second container through said second pipeline; and calculating the volume of the liquid fuel within said first container based on the number of times that the liquid fuel was fed.

* * * * *